US012571664B2

(12) United States Patent (10) Patent No.: US 12,571,664 B2
Iwano et al. (45) Date of Patent: Mar. 10, 2026

(54) DATA PROCESSING DEVICE, MEASUREMENT SYSTEM, AND DATA PROCESSING METHOD

(71) Applicant: NEC Corporation, Tokyo (JP)

(72) Inventors: Tadayuki Iwano, Tokyo (JP); Yoshiaki Aono, Tokyo (JP)

(73) Assignee: NEC CORPORATION, Tokyo (JP)

( * ) Notice: Subject to any disclaimer, the term of this patent is extended or adjusted under 35 U.S.C. 154(b) by 287 days.

(21) Appl. No.: 18/277,191

(22) PCT Filed: Mar. 26, 2021

(86) PCT No.: PCT/JP2021/013019
§ 371 (c)(1),
(2) Date: Aug. 14, 2023

(87) PCT Pub. No.: WO2022/201526
PCT Pub. Date: Sep. 29, 2022

(65) Prior Publication Data
US 2024/0118117 A1      Apr. 11, 2024

(51) Int. Cl.
*G01D 21/02* (2006.01)
*G01D 3/00* (2006.01)
*G01D 15/14* (2006.01)

(52) U.S. Cl.
CPC .............. *G01D 21/02* (2013.01); *G01D 3/00* (2013.01); *G01D 15/14* (2013.01); *G01D 2205/10* (2021.05)

(58) Field of Classification Search
CPC .......... G01D 21/02; G01D 3/00; G01D 15/14; G01D 2205/10; G01D 21/00
See application file for complete search history.

(56) References Cited

U.S. PATENT DOCUMENTS 6,445,445 B1 * 9/2002 Nakayama ......... G01M 11/3136
356/73.1
7,997,792 B2 * 8/2011 Sasaoka ................. G01K 11/32
356/73.1
(Continued)

FOREIGN PATENT DOCUMENTS

JP      2001-264214 A      9/2001
JP      2004-099264 A      4/2004
(Continued)

OTHER PUBLICATIONS

International Search Report for PCT Application No. PCT/JP2021/013019, mailed on May 25, 2021.
(Continued)

*Primary Examiner* — Francis C Gray
(74) *Attorney, Agent, or Firm* — Sughrue Mion, PLLC

(57) ABSTRACT

Provided are a data processing device, etc. that makes it possible to measure an object between adjacent positions where measurement instruments are installed. A data processing device comprises: at least one memory configured to store instructions; and at least one processor configured to execute the instructions to acquire, from each measurement instrument installed at different measurement positions, measurement data indicating results of measuring an object, to acquire sensing data from an optical fiber cable laid so as to pass through each of the different measurement positions, and to use the sensing data to interpolate measurement data.

17 Claims, 10 Drawing Sheets

(56)         References Cited

U.S. PATENT DOCUMENTS

| 10,445,403 | B2 * | 10/2019 | Bessler | G06F 17/17 |
| 2012/0143522 | A1 * | 6/2012 | Chen | G01L 1/2281 |
| | | | | 702/42 |
| 2015/0032418 | A1 | 1/2015 | Akiyama et al. | |
| 2017/0184463 | A1 * | 6/2017 | Imai | G01L 1/242 |
| 2020/0209020 | A1 * | 7/2020 | Issa | G01H 9/004 |
| 2022/0032943 | A1 | 2/2022 | Yoda et al. | |

FOREIGN PATENT DOCUMENTS

| JP | 2005-110008 A | 4/2005 |
| JP | 2009-265077 A | 11/2009 |
| JP | 2015-026196 A | 2/2015 |
| WO | 2020/116030 A1 | 6/2020 |

OTHER PUBLICATIONS

English translation of Written opinion for PCT Application No. PCT/JP2021/013019, mailed on May 25, 2021.
JP Official Communication for JP Application No. 2023-508398, mailed on Aug. 6, 2024 with English Translation.

* cited by examiner

Fig.7

TRAVEL AT
150 km/h

P2_1

TRAVEL AT
100 km/h

P1_2

TRAVEL AT
150 km/h

P2_2

TRAVEL AT
100 km/h

P1_3

P1_1

1_1

1_2

1_3

2

DATA PROCESSING DEVICE, MEASUREMENT SYSTEM, AND DATA PROCESSING METHOD

This application is a National Stage Entry of PCT/JP2021/013019 filed on Mar. 26, 2021, the contents of all of which are incorporated herein by reference, in their entirety.

TECHNICAL FIELD

The present disclosure relates to a data processing device and the like.

BACKGROUND ART

A technology for, by using a plurality of measuring apparatuses installed at a plurality of spots, respectively, measuring a measurement target at each spot is known. Specifically, for example, a technology for, by using a plurality of measuring apparatuses installed at a plurality of spots on a road, respectively, measuring the travel speed of an automobile at each spot is known (see paragraph in PTL 1, and the like).

A technology described in PTL 2 is also known as a related technology.

CITATION LIST

Patent Literature

PTL 1: Japanese Unexamined Patent Application Publication No. 2015-026196
PTL 2: Japanese Unexamined Patent Application Publication No. 2009-265077

SUMMARY OF INVENTION

Technical Problem

As described above, by using a plurality of measuring apparatuses installed at a plurality of spots, respectively, a measurement target at each spot can be measured. However, there is an issue that measurement of a measurement target between two spots adjacent to each other out of the plurality of spots is difficult. Specifically, for example, there is an issue that measurement of the travel speed of an automobile between the two spots on a road is difficult.

The present disclosure has been made in order to resolve the issue as described above, and an object of the present disclosure is to provide a data processing device and the like that can achieve measurement of a measurement target between adjacent spots where measuring apparatuses are installed.

Solution to Problem

One form of a data processing device according to the present disclosure includes: a measurement data acquisition means for acquiring measurement data indicating a measurement result of a measurement target from each of measuring apparatuses installed at each of different measurement spots; a sensing data acquisition means for acquiring sensing data acquired by using an optical fiber cable laid in such a way as to pass through each of the different measurement spots; and a data interpolation means for interpolating the measurement data by using the sensing data.

One form of a measurement system according to the present disclosure includes: a measurement data acquisition means for acquiring measurement data indicating a measurement result of a measurement target from each of measuring apparatuses installed at each of different measurement spots; a sensing data acquisition means for acquiring sensing data acquired by using an optical fiber cable laid in such a way as to pass through each of the different measurement spots; and a data interpolation means for interpolating the measurement data by using the sensing data.

One form of a data processing method according to the present disclosure includes: by a measurement data acquisition means, acquiring measurement data indicating a measurement result of a measurement target from each of measuring apparatuses installed at each of different measurement spots; by a sensing data acquisition means, acquiring sensing data acquired by using an optical fiber cable laid in such a way as to pass through each of the different measurement spots; and, by a data interpolation means, interpolating the measurement data by using the sensing data.

Advantageous Effects of Invention

The present disclosure enables measurement of a measurement target between adjacent spots where measuring apparatuses are installed.

BRIEF DESCRIPTION OF DRAWINGS

FIG. 7 is a diagram illustrating specific examples of a measurement spot, a measuring apparatus, a measurement target, and the like.

FIG. 8 is a diagram illustrating other specific examples of a measurement spot, a measuring apparatus, a measurement target, and the like.

EXAMPLE EMBODIMENT

An example embodiment of the present disclosure will be described in detail below with reference to accompanying drawings.

First Example Embodiment

Figure 1:
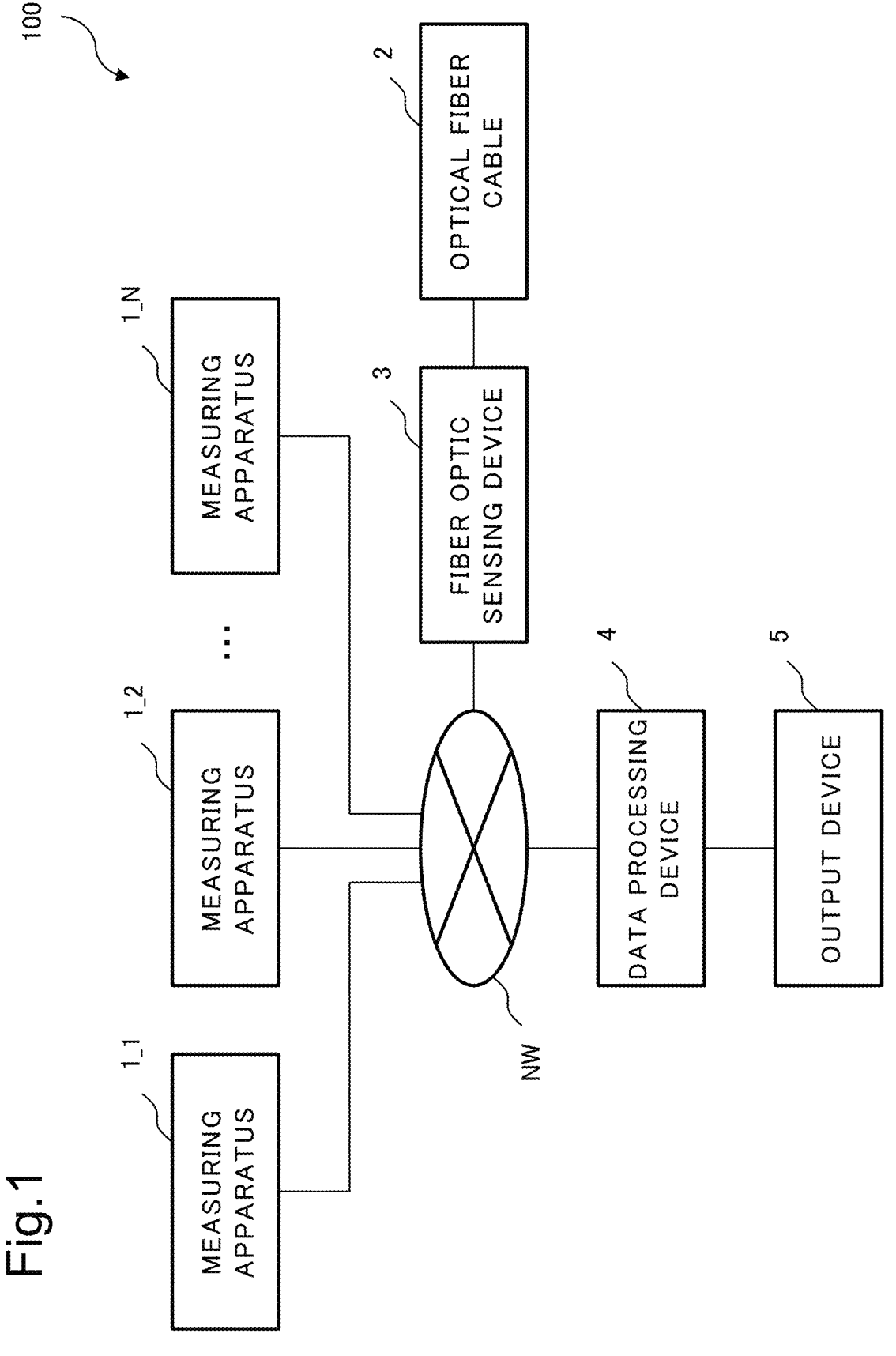
FIG. 1 is a block diagram illustrating a main part of a measurement system according to a first example embodiment.
Figure 2:
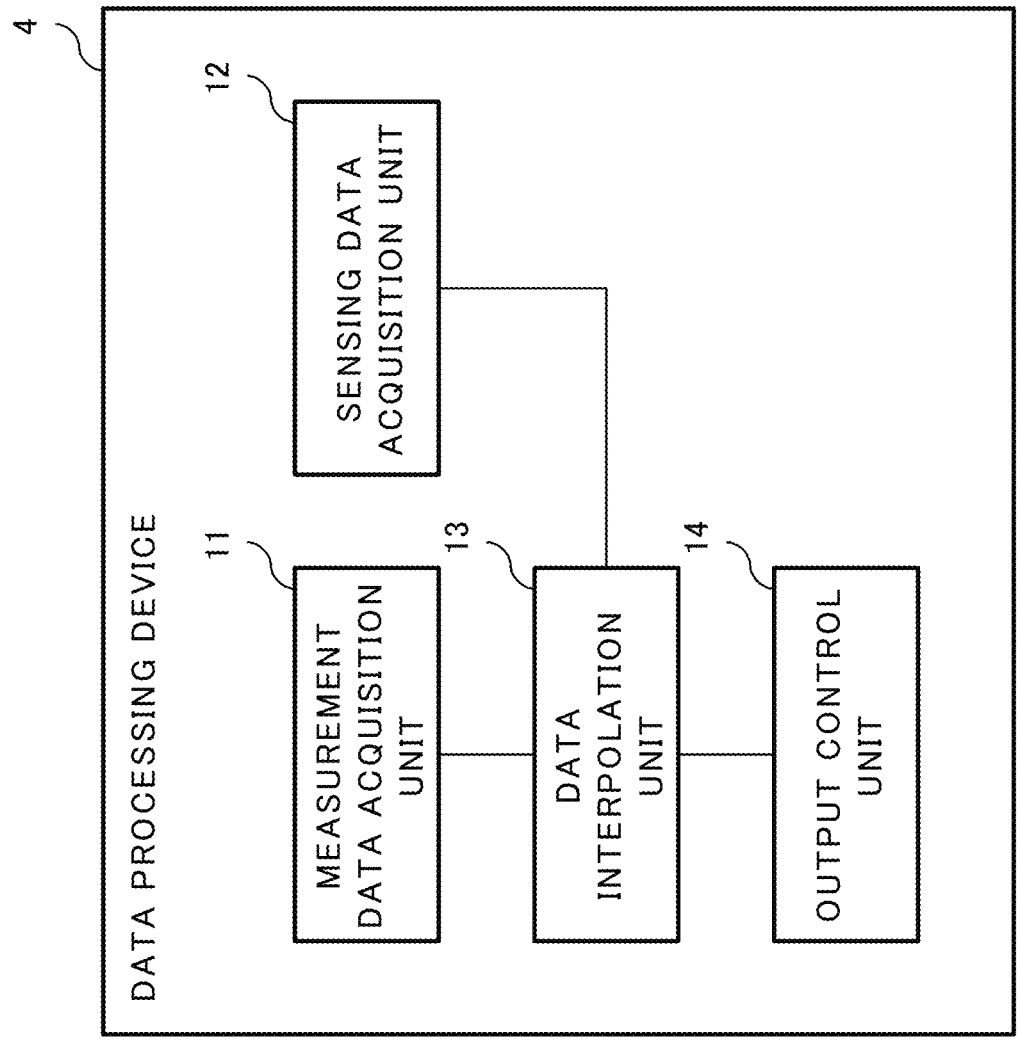
FIG. 2 is a block diagram illustrating a main part of a data processing device according to the first example embodiment.

FIG. 1 is a block diagram illustrating a main part of a measurement system according to a first example embodiment. FIG. 2 is a block diagram illustrating a main part of a data processing device according to the first example embodiment. The measurement system according to the first example embodiment will be described with reference to FIG. 1 and FIG. 2.

As illustrated in FIG. 1, the measurement system 100 includes N measuring apparatuses 1_1 to 1_N. N is an integer equal to or greater than 2. The measurement system 100 further includes an optical fiber cable 2, a fiber optic sensing device 3, a data processing device 4, and an output device 5. The data processing device 4 can communicate with each measuring apparatus 1 and the fiber optic sensing device 3 through a network NW.

The N measuring apparatuses 1_1 to 1_N are installed at N spots P1_1 to P1_N (may be hereinafter referred to as "measurement spots"), respectively. In other words, the measuring apparatuses 1_1 to 1_N are installed at spots P1 different from each other. Each measuring apparatus 1 measures a measurement target at a related spot P1.

Specifically, for example, the measuring apparatuses 1_1 to 1_N are installed at spots P1_1 to P1_N on an expressway. Each measuring apparatus 1 is configured with an apparatus measuring the travel speed of an automobile at a related spot P1. Specifically, each measuring apparatus 1 is configured with a so-called "Orbis device," a surveillance camera, an electronic toll collection system (ETC) gate, or the like. In this case, the travel speed of an automobile at each spot P1 on the expressway is measured by using the measuring apparatuses 1_1 to 1_N. Such a specific example is hereinafter referred to as a "first specific example."

Alternatively, for example, the spots P1_1 to P1_N are set to be spots included in areas different from each other. Each measuring apparatus 1 is configured with an apparatus measuring the temperature at a related spot P1. Specifically, each measuring apparatus 1 is configured with a thermometer or the like. In this case, the temperature in each area (more specifically, the temperature at each spot P1) is measured by using the measuring apparatuses 1_1 to 1_N. Such a specific example is hereinafter referred to as a "second specific example."

The optical fiber cable 2 is laid in such a way as to pass through the spots P1_1 to P1_N. In other words, the optical fiber cable 2 is laid along a predetermined route including the spots P1_1 to P1_N.

For example, the optical fiber cable 2 is laid underground along the expressway including the spots P1_1 to P1_N in the first specific example. Alternatively, for example, the optical fiber cable 2 is installed overhead along a route including the spots P1_1 to P1_N and connecting areas related to the spots P1_1 to P1_N in the second specific example. For example, such overhead installation may be provided by a plurality of steel towers (unillustrated) or a plurality of utility poles (unillustrated).

The optical fiber cable 2 may be used for fiber optic sensing. Specifically, for example, the optical fiber cable 2 may be used for detection of vibration, sound, or temperature by distributed fiber optic sensing (DFOS). Data acquired by execution of fiber optic sensing using the optical fiber cable 2 may be hereinafter collectively referred to as "sensing data."

An existing optical fiber cable for communication may be used as the optical fiber cable 2. For example, an existing optical ground wire (OPGW) may be used as the optical fiber cable 2. Alternatively, a dedicated optical fiber cable for fiber optic sensing may be used as the optical fiber cable 2.

The fiber optic sensing device 3 acquires sensing data by executing fiber optic sensing (more specifically, DFOS) using the optical fiber cable 2. The fiber optic sensing device 3 outputs the acquired sensing data. For example, the fiber optic sensing device 3 is configured with a distributed vibration sensing (DVS) device or a distributed acoustic sensing (DAS) device. Alternatively, for example, the fiber optic sensing device 3 is configured with a distributed temperature sensing (DTS) device.

For example, the fiber optic sensing device 3 is configured with a DVS device or a DAS device in the first specific example. Therefore, sensing data acquired by the fiber optic sensing device 3 are vibration data or sound data generated by travel of an automobile. Specifically, the sensing data are a distribution of vibration strength or sound strength with respect to the longitudinal direction of the optical fiber cable 2 and include a distribution for each frequency component.

On the other hand, for example, the fiber optic sensing device 3 is configured with a DTS device in the second specific example. Therefore, sensing data acquired by the fiber optic sensing device 3 are temperature data indicating the temperature around the optical fiber cable 2. Specifically, the sensing data are a distribution with respect to the longitudinal direction of the optical fiber cable 2 and includes a distribution of a relative value related to the temperature (such as a ratio of the strength of Raman scattering light).

As illustrated in FIG. 2, the data processing device 4 includes a measurement data acquisition unit 11, a sensing data acquisition unit 12, a data interpolation unit 13, and an output control unit 14.

The measurement data acquisition unit 11 acquires data including a value measured by each measuring apparatus 1 (hereinafter referred to as "measurement data"). In other words, measurement data are data indicating a value of a measurement target at each spot P1. Such a value may be hereinafter referred to as a "measured value" or a "measurement result." For example, measurement data are acquired from each measuring apparatus 1 through the network NW.

Specifically, measurement data are data including a value indicating the travel speed of an automobile at each spot P1 in the first specific example. The value is an absolute value in predetermined units (such as kilometers per hour). On the other hand, measurement data are data including a value indicating the temperature at each spot P1 in the second specific example. The value is also an absolute value in predetermined units (such as degrees Celsius).

The sensing data acquisition unit 12 acquires sensing data output by the fiber optic sensing device 3. For example, the sensing data are acquired from the fiber optic sensing device 3 through the network NW.

The data interpolation unit 13 interpolates measurement data acquired by the measurement data acquisition unit 11, by using sensing data acquired by the sensing data acquisition unit 12. Interpolation performed by the data interpolation unit 13 is geographical interpolation (that is, spatial interpolation).

Specifically, the acquired measurement data include a value of a measurement target (measured value) at each of the N spots P1_1 to P1_N. On the other hand, the data interpolation unit 13 estimates a value of a measurement target at a spot P2 between two spots P1 adjacent to each other out of the N spots P1_1 to P1_N by using the acquired sensing data. Such a value may be hereinafter referred to as an "estimated value." Measurement data are geographically interpolated by calculation of an estimated value at each spot P2. In other words, measurement of a measurement target between spots P1 where measuring apparatuses 1 are installed is indirectly achieved.

The data interpolation unit 13 estimates the travel speed of an automobile at each spot P2 in the first specific example. For example, waterfall data based on the acquired sensing data are used in such estimation.

Specifically, the acquired sensing data include a distribution of vibration strength or sound strength with respect to the longitudinal direction of the optical fiber cable 2 for a frequency component related to vibration or sound that may be generated by travel of an automobile. The data interpolation unit 13 plots a value of such vibration strength or sound strength on a virtual two-dimensional map with a first axis related to time and a second axis related to the distance from the fiber optic sensing device 3 on the optical fiber cable 2. Thus, waterfall data are generated.

The data interpolation unit 13 extracts a part related to vibration strength or sound strength with a predetermined value or greater in such a two-dimensional map. The extracted part has a high probability of being related to the position of an automobile at each time. Accordingly, the slope of a line connecting the extracted parts has a high probability of being related to the travel speed of the automobile at each position. The data interpolation unit 13 calculates the slope of the line at a position related to each spot P2 (that is, a distance related to each spot P2). Thus, the travel speed of the automobile at each spot P2 is estimated. In other words, an estimated value of the travel speed of the automobile at each spot P2 is calculated.

Measurement data may include the measurement time of a measured value at each spot P1. The data interpolation unit 13 may generate waterfall data in a time section from the first time to the last time out of the measurement times.

In addition, various generally known technologies may be used in travel speed estimation using sensing data. Detailed description of the technologies is omitted.

The data interpolation unit 13 estimates the temperature at each spot P2 in the second specific example. For example, at least one measured value out of N measured values included in the acquired measurement data are used in addition to the acquired sensing data in such estimation.

Specifically, the acquired measurement data include an absolute value (a measured value) indicating the temperature at each spot P1. Further, the acquired sensing data include a relative value related to the temperature at each spot P1 and also include a relative value related to the temperature at each spot P2. For one of two spots P1 adjacent to each other, the data interpolation unit 13 calculates a correction value based on an amount of deviation between a related absolute value (measured value) and a related relative value, by using the pieces of data. The calculated correction value is a value for converting, for each spot P2 between such two spots P1, a related relative value into a related absolute value. For each spot P2 between such two spots P1, the data interpolation unit 13 converts a related relative value into a related absolute value by using the calculated correction value. Thus, an estimated value of the temperature at each spot P2 is calculated. In other words, the temperature at each spot P2 is estimated.

For example, it is assumed that one spot P2_1 is positioned between two spots P1_1 and P1_2 adjacent to each other. In this case, the data interpolation unit 13 calculates a correction value for estimating the temperature at the spot P2_1, based on an amount of deviation between an absolute value and a relative value at the spot P1_1 or an amount of deviation between an absolute value and a relative value at the spot P1_2. The data interpolation unit 13 calculates an estimated value of the temperature at a spot P2_1 by converting a relative value at the spot P2_1 into an absolute value by using the calculated correction value.

For calculation of a correction value, it is suitable to use an absolute value and a relative value at a spot P1 with a smaller distance from the installation position of the fiber optic sensing device 3 out of such two spots P1_1 and P1_2 in terms of a distance on the optical fiber cable 2. The reason is that detection precision of a relative value at a spot P1 with a smaller value of such a distance is normally higher than detection precision of a relative value at the other spot P1 in fiber optic sensing.

The data interpolation unit 13 may calculate, for each of such two spots P1_1 and P1_2, a correction value based on an amount of deviation between a related absolute value and a related relative value. In this case, the data interpolation unit 13 may use a statistical value (such as a mean value) based on the two calculated correction values for estimation of the temperature at the spot P2_1.

In addition, various generally known technologies may be used in temperature estimation using sensing data. Detailed description of the technologies is omitted.

The output control unit 14 executes control of outputting data after interpolation by the data interpolation unit 13 (may be hereinafter referred to as "interpolated data"). The output device 5 is used for output of interpolated data (see FIG. 1). For example, the output device 5 includes at least one of a display device, a voice output device, and a communication device. For example, the display device is configured by using a display. For example, the voice output device is configured by using a speaker. For example, the communication device is configured by using a dedicated transmitter and a dedicated receiver.

Specifically, for example, the output control unit 14 executes control of displaying an image related to interpolated data. The display device in the output device 5 is used for display of such an image. For example, the displayed image may be an image including a table including a number indicating a measured value at each spot P1 and a number indicating an estimated value at each spot P2. Alternatively, for example, the displayed image may be an image including a graph based on the numerical values. Alternatively, for example, the displayed image may be a map image including the spots P1 and P2 on which a number indicating a measured value at each spot P1 and a number indicating an estimated value at each spot P2 are displayed by superimposition. In addition, the displayed image may be any image related to interpolated data.

Alternatively, for example, the output control unit 14 executes control of outputting a voice related to interpolated data. The voice output device in the output device 5 is used for output of such a voice.

Alternatively, for example, the output control unit 14 executes control of transmitting a signal related to interpolated data. The communication device in the output device 5 is used for transmission of such a signal. For example, such a signal is transmitted to another system (unillustrated). Such a signal in the first specific example is transmitted to a system monitoring the travel speed of an automobile on an expressway, a system collecting information about an automobile traveling on an expressway, or the like. Such a signal in the second specific example is transmitted to a system collecting information about the weather in each area, or the like. In addition, such a signal may be transmitted to any system using interpolated data.

The main part of the measurement system 100 is thus configured.

The measurement data acquisition unit 11 may be hereinafter referred to as a "measurement data acquisition means." The sensing data acquisition unit 12 may be referred to as a "sensing data acquisition means." The data interpolation unit 13 may be referred to as a "data interpolation means." The output control unit 14 may be referred to as an "output control means." Next, a hardware configuration of the main part of the data processing device 4 will be described with reference to FIG. 3 to FIG. 5.

Figure 3:
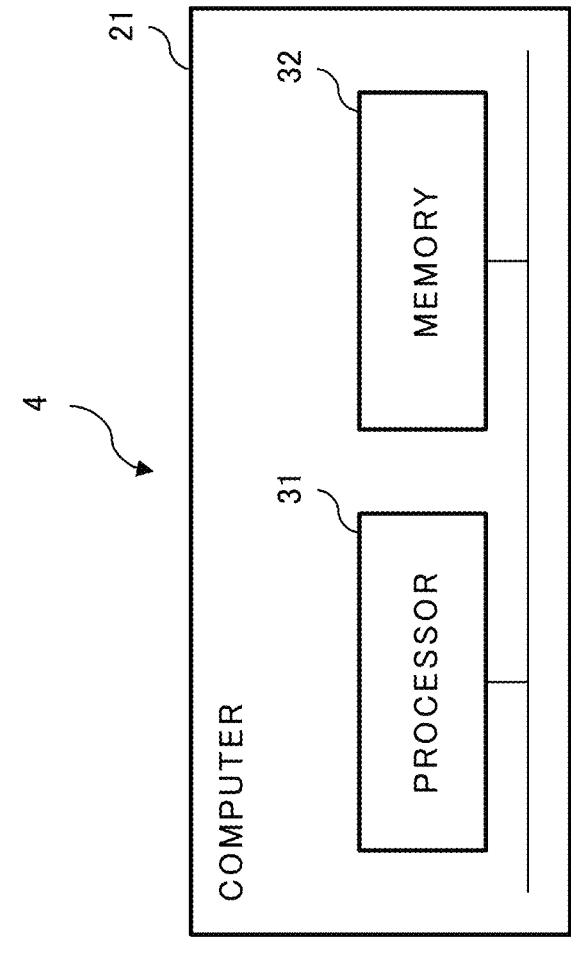
FIG. 3 is a block diagram illustrating a hardware configuration of the main part of the data processing device according to the first example embodiment.
Figure 4:
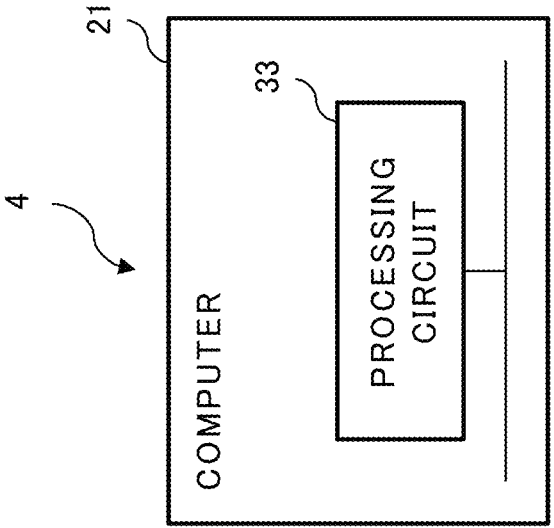
FIG. 4 is a block diagram illustrating another hardware configuration of the main part of the data processing device according to the first example embodiment.
Figure 5:
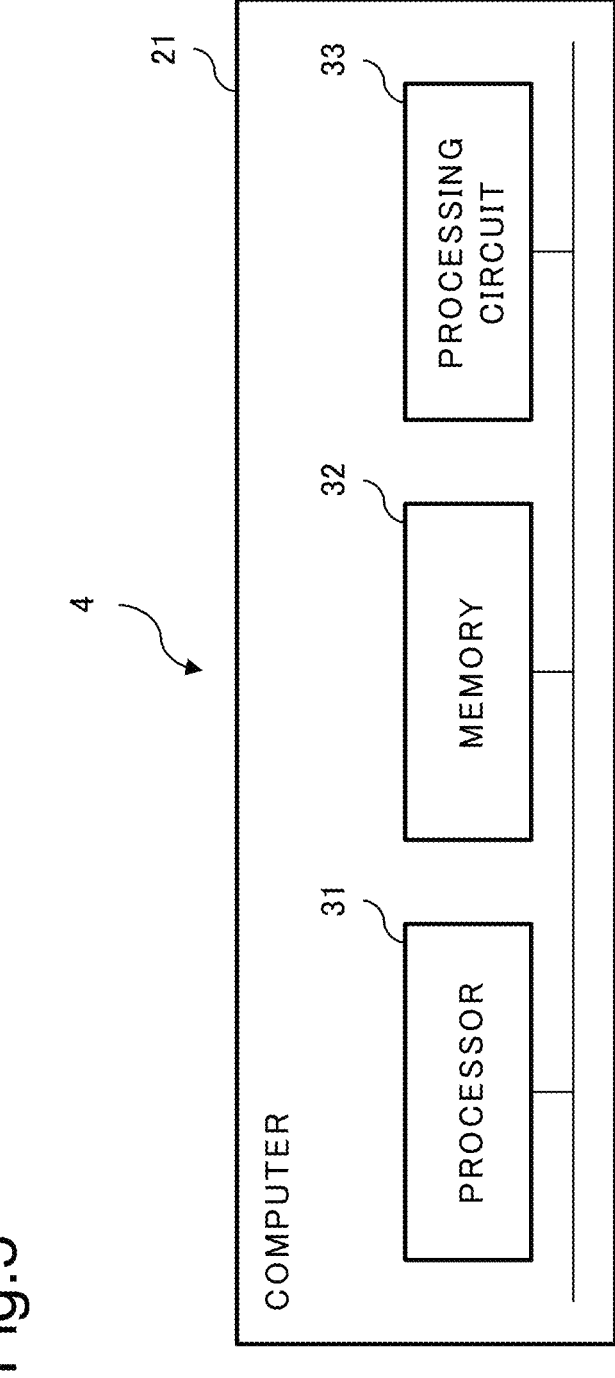
FIG. 5 is a block diagram illustrating another hardware configuration of the main part of the data processing device according to the first example embodiment.

The data processing device 4 is configured by using a computer 21, as illustrated in each of FIG. 3 to FIG. 5.

The computer 21 includes a processor 31 and a memory 32 as illustrated in FIG. 3. The memory 32 stores a program for causing the computer 21 to function as the measurement data acquisition unit 11, the sensing data acquisition unit 12, the data interpolation unit 13, and the output control unit 14. The processor 31 reads and executes the program stored in the memory 32. Thus, a function F1 of the measurement data acquisition unit 11, a function F2 of the sensing data acquisition unit 12, a function F3 of the data interpolation unit 13, and a function F4 of the output control unit 14 are achieved.

Alternatively, the computer 21 includes a processing circuit 33, as illustrated in FIG. 4. The processing circuit 33 executes processing for causing the computer 21 to function as the measurement data acquisition unit 11, the sensing data acquisition unit 12, the data interpolation unit 13, and the output control unit 14. Thus, the functions F1 to F4 are achieved.

Alternatively, the computer 21 includes the processor 31, the memory 32, and the processing circuit 33, as illustrated in FIG. 5. In this case, part of the functions F1 to F4 is achieved by the processor 31 and the memory 32, and the remainder of the functions F1 to F4 is achieved by the processing circuit 33.

The processor 31 is configured with one or more processors. For example, each processor is configured by using a central processing unit (CPU), a graphics processing unit (GPU), a microprocessor, a microcontroller, or a digital signal processor (DSP).

The memory 32 is configured with one or more memories. For example, each memory is configured by using a random-access memory (RAM), a read-only memory (ROM), a flash memory, an erasable programmable read-only memory (EPROM), an electrically erasable programmable read-only memory (EEPROM), a solid-state drive, a hard disk drive, a flexible disk, a compact disc, a digital versatile disc (DVD), a Blu-ray disc, a magneto-optical (MO) disk, or a mini disk.

The processing circuit 33 is configured with one or more processing circuits. For example, each processing circuit is configured by using an application specific integrated circuit (ASIC), a programmable logic device (PLD), a field programmable gate array (FPGA), a system on a chip (SoC), or a system large scale integration (LSI).

The processor 31 may include a dedicated processor related to each of the functions F1 to F4. The memory 32 may include a dedicated memory related to each of the functions F1 to F4. The processing circuit 33 may include a dedicated processing circuit related to each of the functions F1 to F4.

Figure 6:
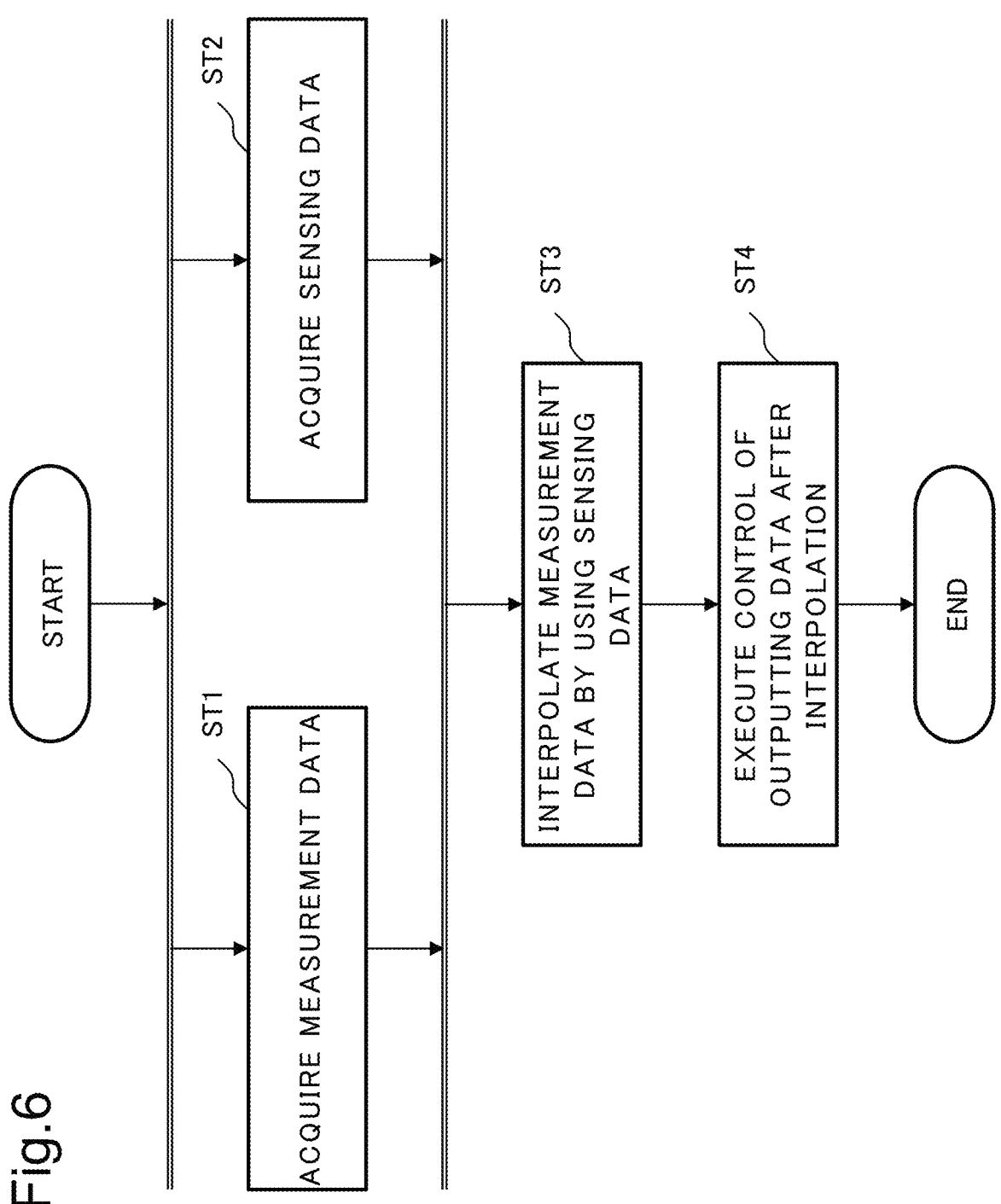
FIG. 6 is a flowchart illustrating the operation of the data processing device according to the first example embodiment.

Next, the operation of the data processing device 4 will be described with reference to a flowchart illustrated in FIG. 6.

First, the measurement data acquisition unit 11 acquires measurement data (Step ST1). Further, the sensing data acquisition unit 12 acquires sensing data (Step ST2). The execution order of Steps ST1 and ST2 is not particularly limited. Next, the data interpolation unit 13 interpolates the measurement data acquired in Step ST1, by using the sensing data acquired in Step ST2 (Step ST3). A specific example of such interpolation is already described. Therefore, repeated description is omitted. Next, the output control unit 14 executes control of outputting data after interpolation (that is, interpolated data) in Step ST3 (Step ST4).

Next, effects provided by use of the measurement system 100 will be described.

As described above, by using sensing data, the data interpolation unit 13 calculates an estimated value of a measurement target at a spot P2 between spots P1 where measuring apparatuses 1 are installed. Thus, measurement data can be geographically interpolated. In other words, measurement of a measurement target between spots P1 where measuring apparatuses 1 are installed can be indirectly achieved.

Figure 7:
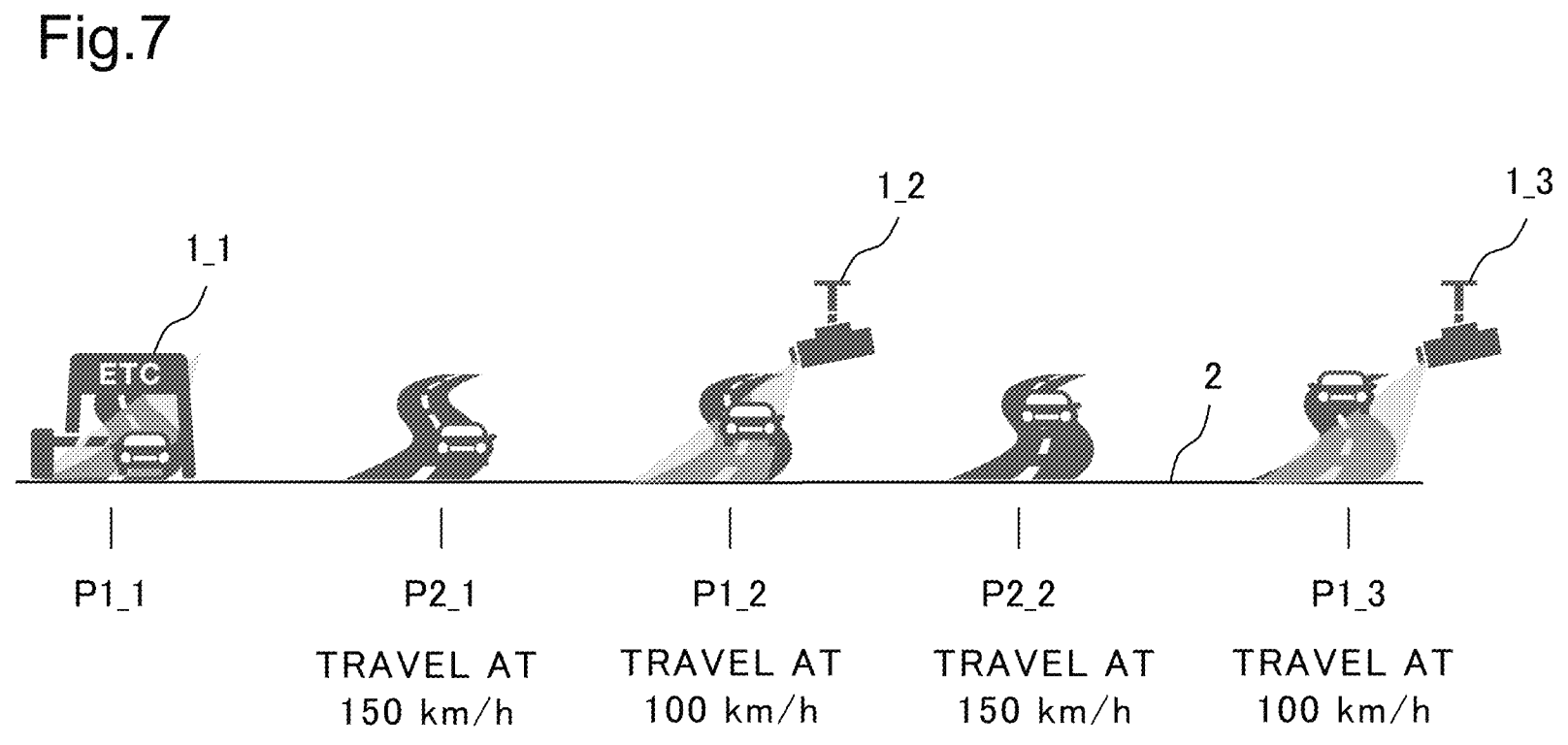

For example, it is assumed that an automobile travels on an expressway, as illustrated in FIG. 7. At this time, it is assumed that, at spots P1 where measuring apparatuses 1 are installed (P1_1 to P1_3 in the diagram), the driver of the automobile notices the measuring apparatuses 1, and the automobile travels at a speed equal to or less than a legal speed limit (such as 120 kilometers per hour). On the other hand, it is assumed that the automobile travels at a speed exceeding the legal speed limit at spots P2 (P2_1 and P2_2 in the diagram) where measuring apparatuses 1 are not installed. Even in such a case, travel of the automobile at a speed exceeding the legal speed limit can be detected by interpolation using sensing data acquired by fiber optic sensing using the optical fiber cable 2 laid underground.

Figure 8:
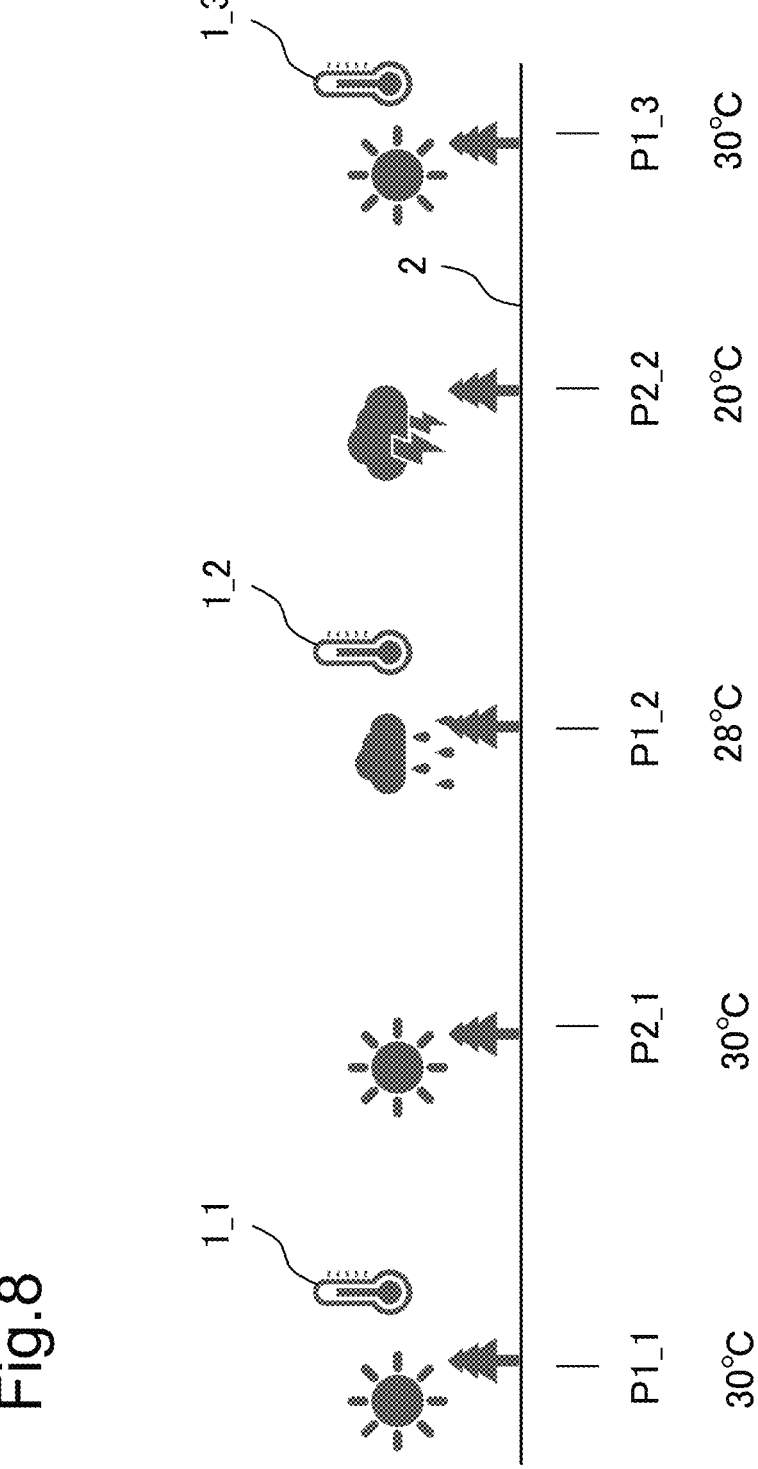

Alternatively, for example, it is assumed that the temperatures in a plurality of areas [more specifically, the temperatures at a plurality of spots P1 (P1_1 to P1_3 in the diagram)] are measured by using thermometers, as illustrated in FIG. 8. At this time, the temperature in each area may vary according to the weather in such an area (such as fine, cloudy, or rainy). On the other hand, the temperature in an area positioned between the aforementioned areas [more specifically, the temperature at each spot P2 (P2_1 and P2_2 in the diagram)] can be estimated by interpolation using sensing data.

In the example illustrated in FIG. 8, so-called "guerrilla torrential rain" is occurring in an area including the spot P2_2. Consequently, the temperature at the spot P2_2 locally falls compared with the temperatures at other spots P1_1 to P1_3 and P2_1. Such a local fall of temperature can be detected in spite of a thermometer not being installed at the spot P2_2, by interpolation using sensing data.

Next, a modified example of the measurement system 100 will be described.

A spot P2 being a target of estimation by the data interpolation unit 13 has only to be a spot being positioned between two spots P1 adjacent to each other and being related to a position where the optical fiber cable 2 is laid. Accordingly, the number of spots P2 between the two spots P1 is not limited to one. For a plurality of spots P2 between the two spots P1, the data interpolation unit 13 may calculate an estimated value of a measurement target at each of the plurality of spots P2.

Further, as described above, sensing data are acquired by DFOS. Then, the data interpolation unit 13 may calculate an estimated value of a measurement target in a section between two spots P1 adjacent to each other instead of calculating an estimated value of a measurement target at a spot P2 between the two spots P1. Such a section has only to be a section being positioned between the two spots P1 and being related to at least part of the optical fiber cable 2.

Further, the data interpolation unit 13 may calculate a statistical value (such as a mean value or a median value) of estimated values in each section. The data interpolation unit 13 may use the calculated statistical value as an estimated value at a spot included in the related section (that is, the spot P2).

Next, another modified example of the measurement system 100 will be described.

A target of measurement by the measuring apparatuses 1_1 to 1_N and a target of estimation by the data interpolation unit 13 in the first specific example are not limited to the travel speed of an automobile on an expressway. A target of such measurement and estimation has only to be the travel speed of a moving body generating vibration or sound by the travel. Specifically, for example, a target of such measurement and estimation may be the travel speed of a railway vehicle, a cable car, a pedestrian, a gondola, a robot, or a drone. In this case, each measuring apparatus 1 has only to be an apparatus measuring the travel speed of the moving body.

A target of measurement by the measuring apparatuses 1_1 to 1_N and a target of estimation by the data interpolation unit 13 in the second specific example are not limited to temperature. A target of such measurement and estimation has only to be a weather observation value detectable by fiber optic sensing. Specifically, for example, targets of such measurement and estimation may be a wind direction and wind speed. In this case, the fiber optic sensing device 3 may be configured with a DVS device or a DAS device, and the data interpolation unit 13 may estimate a wind direction and wind speed by using vibration data or sound data. Each measuring apparatus 1 may be configured with an aerovane.

In addition, a target of such measurement and estimation may be any value detectable by fiber optic sensing.

Figure 9:
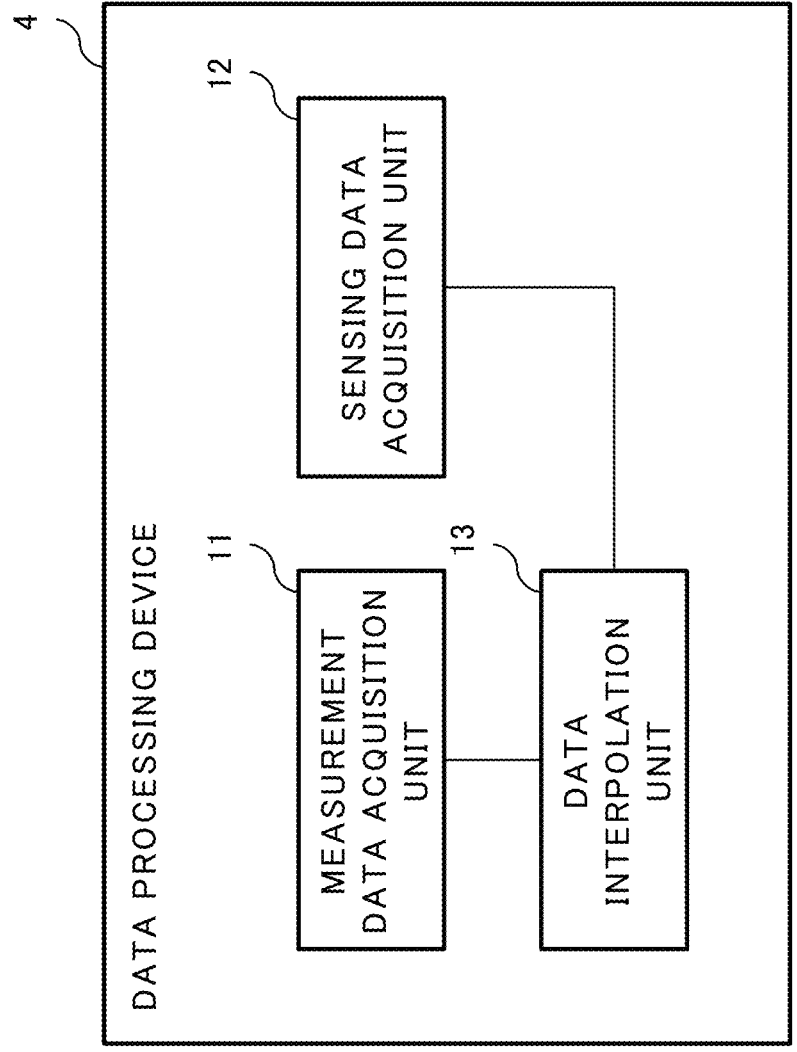
FIG. 9 is a block diagram illustrating a main part of another data processing device according to the first example embodiment.

Next, a modified example of the data processing device 4 will be described with reference to FIG. 9. Further, another modified example of the measurement system 100 will be described with reference to FIG. 10. The data processing device 4 may include the measurement data acquisition unit 11, the sensing data acquisition unit 12, and the data interpolation unit 13, as illustrated in FIG. 9. In other words, the main part of the data processing device 4 may be configured with the measurement data acquisition unit 11, the sensing data acquisition unit 12, and the data interpolation unit 13. In this case, the output control unit 14 may be provided outside the data processing device 4.

Figure 10:
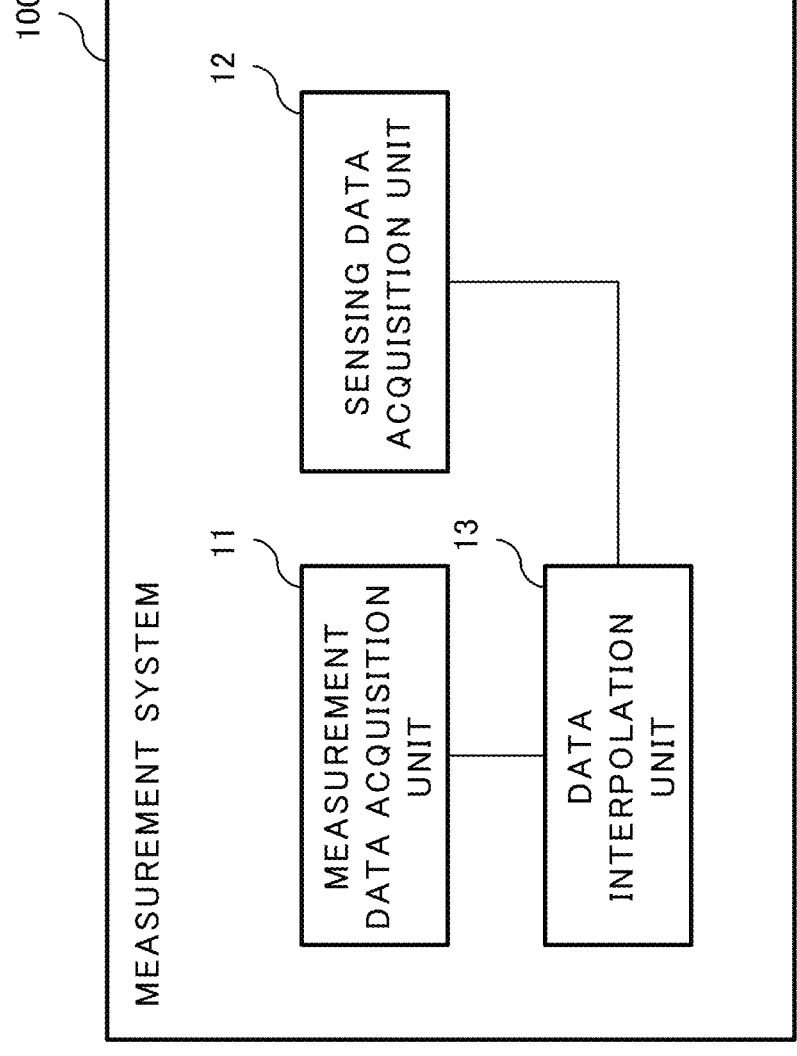
FIG. 10 is a block diagram illustrating a main part of another measurement system according to the first example embodiment.

The measurement system 100 may include the measurement data acquisition unit 11, the sensing data acquisition unit 12, and the data interpolation unit 13, as illustrated in FIG. 10. In other words, the main part of the measurement system 100 may be configured with the measurement data acquisition unit 11, the sensing data acquisition unit 12, and the data interpolation unit 13. In this case, the measuring apparatuses 1_1 to 1_N, the optical fiber cable 2, the fiber optic sensing device 3, and the output device 5 may be provided outside the measurement system 100. Further, the output control unit 14 may be provided outside the measurement system 100.

Even in such cases, the effects as described above can be provided. Specifically, the measurement data acquisition unit 11 acquires measurement data indicating a measurement result of a measurement target from each measuring apparatus 1 (unillustrated in FIG. 9 and FIG. 10) installed at each of different measurement spots P1. The sensing data acquisition unit 12 acquires sensing data acquired by using the optical fiber cable 2 (unillustrated in FIG. 9 and FIG. 10) laid in such a way as to pass through each of the different measurement spots P1. The data interpolation unit 13 interpolates measurement data by using sensing data. By interpolating measurement data by using sensing data, measurement of a measurement target between spots P1 where measuring apparatuses 1 are installed can be indirectly achieved.

The measurement system 100 may include the output control unit 14 in addition to the measurement data acquisition unit 11, the sensing data acquisition unit 12, and the data interpolation unit 13. Each component in the measurement system 100 may be configured with an independent device. The devices may be distributed geographically or network-wise. For example, the devices may include an edge computer and a cloud computer.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The whole or part of the example embodiments disclosed above may also be described as, but not limited to, the following Supplementary Notes.

SUPPLEMENTARY NOTES

[Supplementary Note 1]

A data processing device including:

a measurement data acquisition means for acquiring measurement data indicating a measurement result of a measurement target from each of measuring apparatuses installed at each of different measurement spots;

a sensing data acquisition means for acquiring sensing data acquired by using an optical fiber cable laid in such a way as to pass through each of the different measurement spots; and a data interpolation means for interpolating the measurement data by using the sensing data.

[Supplementary Note 2]

The data processing device according to Supplementary Note 1, wherein the data interpolation means interpolates the measurement data by calculating, by using the sensing data, an estimated value of the measurement target at a spot or in a section between measurement spots adjacent to each other out of the different measurement spots.

[Supplementary Note 3]

The data processing device according to Supplementary Note 1 or 2, wherein the measurement target is travel speed of a moving body.

[Supplementary Note 4]

The data processing device according to Supplementary Note 1 or 2, wherein the measurement target is a weather observation value.

[Supplementary Note 5]

The data processing device according to Supplementary Note 1 or 2, wherein the measurement result is an absolute value related to the measurement target, and the sensing data include a relative value related to the measurement target.

[Supplementary Note 6]

The data processing device according to any one of Supplementary Notes 1 to 5, wherein data after interpolation by the data interpolation means are output.

[Supplementary Note 7]

A measurement system including:

a measurement data acquisition means for acquiring measurement data indicating a measurement result of a measurement target from each of measuring apparatuses installed at each of different measurement spots;

a sensing data acquisition means for acquiring sensing data acquired by using an optical fiber cable laid in such a way as to pass through each of the different measurement spots; and a data interpolation means for interpolating the measurement data by using the sensing data.

[Supplementary Note 8]

The measurement system according to Supplementary Note 7, wherein the data interpolation means interpolates the measurement data by calculating, by using the sensing data, an estimated value of the measurement target at a spot or in a section between measurement spots adjacent to each other out of the different measurement spots.

[Supplementary Note 9]

The measurement system according to Supplementary Note 7 or 8, wherein the measurement target is travel speed of a moving body.

[Supplementary Note 10]

The measurement system according to Supplementary Note 7 or 8, wherein the measurement target is a weather observation value.

[Supplementary Note 11]

The measurement system according to Supplementary Note 7 or 8, wherein the measurement result is an absolute value related to the measurement target, and the sensing data include a relative value related to the measurement target.

[Supplementary Note 12]

The measurement system according to any one of Supplementary Notes 7 to 11, wherein data after interpolation by the data interpolation means are output.

[Supplementary Note 13]

A data processing method including:

by a measurement data acquisition means, acquiring measurement data indicating a measurement result of a measurement target from each of measuring apparatuses installed at each of different measurement spots;

by a sensing data acquisition means, acquiring sensing data acquired by using an optical fiber cable laid in such a way as to pass through each of the different measurement spots; and, by a data interpolation means, interpolating the measurement data by using the sensing data.

[Supplementary Note 14]

The data processing method according to Supplementary Note 13, wherein the data interpolation means interpolates the measurement data by calculating, by using the sensing data, an estimated value of the measurement target at a spot or in a section between measurement spots adjacent to each other out of the different measurement spots.

[Supplementary Note 15]

The data processing method according to Supplementary Note 13 or 14, wherein the measurement target is travel speed of a moving body.

[Supplementary Note 16]

The data processing method according to Supplementary Note 13 or 14, wherein the measurement target is a weather observation value.

[Supplementary Note 17]

The data processing method according to Supplementary Note 13 or 14, wherein the measurement result is an absolute value related to the measurement target, and the sensing data include a relative value related to the measurement target.

[Supplementary Note 18]

The data processing method according to any one of Supplementary Notes 13 to 17, wherein data after interpolation by the data interpolation means are output.

[Supplementary Note 19]

A recording medium on which a program is recorded, the program causing a computer to function as:

a measurement data acquisition means for acquiring measurement data indicating a measurement result of a measurement target from each of measuring apparatuses installed at each of different measurement spots;

a sensing data acquisition means for acquiring sensing data acquired by using an optical fiber cable laid in such a way as to pass through each of the different measurement spots; and a data interpolation means for interpolating the measurement data by using the sensing data.

[Supplementary Note 20]

The recording medium according to Supplementary Note 19, wherein the data interpolation means interpolates the measurement data by calculating, by using the sensing data, an estimated value of the measurement target at a spot or in a section between measurement spots adjacent to each other out of the different measurement spots.

[Supplementary Note 21]

The recording medium according to Supplementary Note 19 or 20, wherein the measurement target is travel speed of a moving body.

[Supplementary Note 22]

The recording medium according to Supplementary Note 19 or 20, wherein the measurement target is a weather observation value.

[Supplementary Note 23]

The recording medium according to Supplementary Note 19 or 20, wherein the measurement result is an absolute value related to the measurement target, and the sensing data include a relative value related to the measurement target.

[Supplementary Note 24]

The recording medium according to any one of Supplementary Notes 19 to 23, wherein the program further causes the computer to function as an output control means for executing control of outputting data after interpolation by the data interpolation means.

REFERENCE SIGNS LIST

1 Measuring apparatus

2 Optical fiber cable

3 Fiber optic sensing device
4 Data processing device
5 Output device
11 Measurement data acquisition unit
12 Sensing data acquisition unit
13 Data interpolation unit
14 Output control unit
21 Computer
31 Processor
32 Memory
33 Processing circuit
100 Measurement system

What is claimed is:

1. A data processing device comprising:
at least one memory configured to store instructions; and
at least one processor configured to execute the instructions to:
acquire, from each of a plurality of measuring apparatuses installed at each of different measurement spots, measurement data indicating a measurement result of a target measurement,
acquire, from a fiber optic sensing device, sensing data acquired by using an optical fiber cable laid in such a way as to pass through each of the different measurement spots, and
interpolate the measurement data by using the sensing data, wherein
the measurement result is an absolute value related to the target measurement, and
the sensing data includes a relative value related to the target measurement.

2. The data processing device according to claim 1, wherein
the at least one processor interpolates the measurement data by calculating, by using the sensing data, an estimated value of the target measurement at a spot or in a section between measurement spots adjacent to each other out of the different measurement spots.

3. The data processing device according to claim 1, wherein
the target measurement is travel speed of a moving body.

4. The data processing device according to claim 1, wherein
the target measurement is a weather observation value.

5. The data processing device according to claim 1, wherein
data after interpolation by the data interpolation means are output.

6. A measurement system comprising:
at least one memory configured to store instructions; and
at least one processor configured to execute the instructions to
acquire, from each of a plurality of measuring apparatuses installed at each of different measurement spots, measurement data indicating a measurement result of a target measurement,
acquire, from a fiber optic sensing device, sensing data acquired by using an optical fiber cable laid in such a way as to pass through each of the different measurement spots, and interpolate the measurement data by using the sensing data, wherein
the measurement result is an absolute value related to the target measurement, and
the sensing data includes a relative value related to the target measurement.

7. The measurement system according to claim 6, wherein
the at least one processor interpolates the measurement data by calculating, by using the sensing data, an estimated value of the target measurement at a spot or in a section between measurement spots adjacent to each other out of the different measurement spots.

8. The measurement system according to claim 6, wherein
the target measurement is travel speed of a moving body.

9. The measurement system according to claim 6, wherein
the target measurement is a weather observation value.

10. The measurement system according to claim 6, wherein
data after interpolation by the at least one processor are output.

11. A data processing method comprising:
by at least one memory configured to store instructions; and at least one processor configured to execute the instructions, acquiring, from each of a plurality of measuring apparatuses installed at each of different measurement spots, measurement data indicating a measurement result of a target measurement;
by the at least one processor, acquiring, from a fiber optic sensing device, sensing data acquired by using an optical fiber cable laid in such a way as to pass through each of the different measurement spots; and,
by the at least one processor, interpolating the measurement data by using the sensing data, wherein
the measurement result is an absolute value related to the target measurement, and
the sensing data includes a relative value related to the target measurement.

12. The data processing method according to claim 11, wherein
the at least one processor interpolates the measurement data by calculating, by using the sensing data, an estimated value of the target measurement at a spot or in a section between measurement spots adjacent to each other out of the different measurement spots.

13. The data processing method according to claim 11, wherein
the target measurement is travel speed of a moving body.

14. The data processing method according to claim 11, wherein
the target measurement is a weather observation value.

15. The data processing method according to claim 11, wherein
data after interpolation by the at least one processor are output.

16. The data processing device according to claim 2, wherein
the target measurement is travel speed of a moving body.

17. The data processing device according to claim 2, wherein
the target measurement is a weather observation value.

* * * * *